US010221304B2

(12) United States Patent
Li et al.

(10) Patent No.: US 10,221,304 B2
(45) Date of Patent: Mar. 5, 2019

(54) HIGH FREQUENCY WELDABLE ETHYLENE-BASED POLYMER COMPOSITIONS WITH GOOD FLAME RETARDANCY

(71) Applicant: Dow Global Technologies LLC, Midland, MI (US)

(72) Inventors: Guang Ming Li, Sugar Land, TX (US); Laura B. Weaver, Johnson City, TN (US); Jeffrey M. Cogen, Flemington, NJ (US); Stefan Ultsch, Staefa (CH)

(73) Assignee: Dow Global Technologies LLC, Midland, MI (US)

( * ) Notice: Subject to any disclaimer, the term of this patent is extended or adjusted under 35 U.S.C. 154(b) by 25 days.

(21) Appl. No.: 15/502,892

(22) PCT Filed: Sep. 30, 2015

(86) PCT No.: PCT/US2015/053270
§ 371 (c)(1),
(2) Date: Feb. 9, 2017

(87) PCT Pub. No.: WO2016/054242
PCT Pub. Date: Apr. 7, 2016

(65) Prior Publication Data
US 2017/0233564 A1    Aug. 17, 2017

Related U.S. Application Data

(60) Provisional application No. 62/058,970, filed on Oct. 2, 2014.

(51) Int. Cl.
| | | |
|---|---|---|
| *C08L 23/08* | (2006.01) |
| *C08L 31/04* | (2006.01) |
| *C08K 5/34* | (2006.01) |
| *C08L 53/00* | (2006.01) |
| *B29C 45/00* | (2006.01) |
| *B29C 65/04* | (2006.01) |
| *C08L 23/28* | (2006.01) |
| *C08K 5/3417* | (2006.01) |
| *B29C 47/00* | (2006.01) |
| *B29C 65/00* | (2006.01) |

(52) U.S. Cl.
CPC ........ *C08L 23/0815* (2013.01); *C08K 5/3417* (2013.01); *C08L 23/286* (2013.01); *C08L 31/04* (2013.01); *C08L 53/00* (2013.01); *B29C 45/0001* (2013.01); *B29C 47/0004* (2013.01); *B29C 65/04* (2013.01); *B29C 66/73921* (2013.01); *B29K 2023/04* (2013.01); *C08L 2201/02* (2013.01); *C08L 2205/025* (2013.01)

(58) Field of Classification Search
CPC .... C08L 23/0815; C08L 23/286; C08L 31/04; C08L 53/00; C08L 2201/02; C08L 2205/025; C08K 5/3417; B29C 45/0001; B29C 47/0004; B29C 65/04; B29C 66/73921
USPC .......................................... 524/94
See application file for complete search history.

(56) References Cited

U.S. PATENT DOCUMENTS

| | | |
|---|---|---|
| 3,336,173 A | 8/1967 | Renfroe et al. |
| 3,645,992 A | 2/1972 | Elston |
| 4,076,698 A | 2/1978 | Anderson et al. |
| 5,135,785 A | 8/1992 | Millon |
| 5,272,236 A | 12/1993 | Lai et al. |
| 5,278,272 A | 1/1994 | Lai et al. |
| 5,399,396 A | 3/1995 | Ohlsson et al. |
| 5,627,223 A | 5/1997 | Dehennau et al. |
| 6,054,544 A | 4/2000 | Finlayson et al. |
| 6,100,335 A | 8/2000 | Matz et al. |
| 6,335,410 B1 | 1/2002 | Finlayson et al. |
| 6,723,810 B2 | 4/2004 | Finlayson et al. |
| 7,608,668 B2 | 10/2009 | Li Pi Shan et al. |
| 7,858,706 B2 | 12/2010 | Arriola et al. |
| 7,893,166 B2 | 2/2011 | Shan et al. |

(Continued)

FOREIGN PATENT DOCUMENTS

| | | |
|---|---|---|
| JP | 1021904 | 8/1998 |
| WO | 1993/024568 A1 | 12/1993 |

(Continued)

OTHER PUBLICATIONS

PCT/US2015/053270, Dec. 2, 2015, International Search Report and Written Opinion.

(Continued)

*Primary Examiner* — Michael Bernshteyn
(74) *Attorney, Agent, or Firm* — Husch Blackwell LLP

(57) ABSTRACT

The invention provides a composition comprising at least the following components: A) a first composition comprising a first ethylene/α-olefin block copolymer consisting of ethylene and $C_4$-$C_8$ α-olefin comonomer; and where the first composition has a density from 0.87 g/cc to 0.90 g/cc, and a melt index (I2) from 6.0 to 20.0 g/10 min; B) at least one filler that is capable of being excited by an alternating electromagnetic field at a frequency greater than, or equal to 10 MHz; C) at least one flame retardant selected from the group consisting of i) from 30.0 to 50.0 wt % of one or more non-halogen, inorganic flame retardant compounds, based on the weight of the composition; and ii) from 8.0 to 30.0 wt % of one or more halogen-containing flame retardant compounds, based on the weight of the composition; and D) at least one polar polymer.

19 Claims, No Drawings

(56) References Cited

U.S. PATENT DOCUMENTS

| | | | |
|---|---|---|---|
| 7,947,973 B2 | 5/2011 | Song et al. | |
| 2003/0113563 A1* | 6/2003 | Buhring | C08L 23/02 |
| | | | 428/480 |
| 2004/0077791 A1 | 4/2004 | Issum et al. | |
| 2014/0364572 A1* | 12/2014 | Weaver | C08L 23/0853 |
| | | | 525/229 |
| 2015/0106928 A1* | 4/2015 | Steinmann | H04L 51/30 |
| | | | 726/23 |
| 2015/0203693 A1* | 7/2015 | Mestan | C09D 7/61 |
| | | | 428/195.1 |
| 2015/0310962 A1* | 10/2015 | Touge | H01B 3/44 |
| | | | 428/392 |

FOREIGN PATENT DOCUMENTS

| | | |
|---|---|---|
| WO | 2002/088229 A1 | 11/2002 |
| WO | 2013/096705 A1 | 6/2013 |
| WO | 2013096711 A1 | 6/2013 |
| WO | 2014019008 A1 | 2/2014 |
| WO | 2014106928 A1 | 7/2014 |

OTHER PUBLICATIONS

PCT/US2015/053270, Apr. 13, 2017, International Preliminary Report on Patentability.

* cited by examiner

HIGH FREQUENCY WELDABLE ETHYLENE-BASED POLYMER COMPOSITIONS WITH GOOD FLAME RETARDANCY

REFERENCE TO RELATED APPLICATIONS

The present application claims the benefit of U.S. Provisional Application No. 62/058,970, filed on Oct. 2, 2014, incorporated herein by reference.

BACKGROUND

Polymer-coated fabrics are flexible composite materials, comprising the coating (polymer layer) and the substrate (fabric layer), adhered together through a specific coating process. The polymer coating imparts properties on the fabric, such as printing of graphics, impermeability to dust particles, liquids, and gases. The polymer coating can also improve existing physical properties, such as tear and abrasion resistance. The fabric component generally determines the tear and tensile strength, elongation and dimensional stability. However, many properties are determined by a combination of both these components. The base-fabric and the polymer must be carefully selected, by a thorough consideration of the properties required in the finished article.

Radio frequency (RF) weldability and excellent Flame Retardancy are required for many of coated fabric applications. The flexible PVC (polyvinyl chloride) is a common coating material for coated fabric applications, due to the Excellent RF weldability and inherent flame retardancy. Vinyl (PVC) coated polyester is the most common material used on the market today for various applications. Other compositions are described as follows.

International Publication No. WO2013/096705 discloses a method of forming a polyolefin-based article that includes the following: (a) incorporating, into a polyolefin formulation, a filler that is capable of being excited by a high frequency electromagnetic field; (b) forming a substrate from the polyolefin formulation, the substrate having at least one surface; and (c) subjecting the surface of the polyolefin substrate to the high frequency electromagnetic field, under conditions, such that the substrate is welded to a second surface of the polyolefin substrate, or to a surface of a second polyolefin substrate, to form a polyolefin-based article. The polyolefin formulation comprises a zeolite that is ion exchanged with sodium, calcium, or potassium, in an amount of at least five weight percent, based on weight of the polyolefin formulation; and a base polymer selected from the group consisting of the following: (a) a homogeneously branched, linear or substantially linear ethylene/α-olefin copolymer having a density from 0.865 to 0.905 grams per cubic centimeter, and a melt index (measured at 190° C. at 2.13 kilograms) from 0.5 to 30 grams per 10 minutes, (b) a homogeneously branched propylene/α-olefin copolymer having a density from 0.863 to 0.885 grams per cubic centimeter, and a melt flow rate (measured at 230° C. at 2.13 kilograms) from 2 to 30 grams per 10 minutes, or (c) a combination thereof; and where the base polymer has a melting temperature below 100° C. The polyolefin substrate exhibits a cohesive welding failure and a weld strength, for a 10 mil (0.254 millimeter) thickness, that is greater than 7 pounds per inch (1.23 Newtons per millimeter), at a welding time of less than, or equal to, six seconds, to form a polyolefin-based article.

U.S. Pat. No. 3,336,173 discloses the blends of polyolefins and fiber-forming polymeric carbonamide, to form an electronic-weldable fabric. U.S. Pat. No. 5,627,223 discloses a composition comprising a polyolefin, a thermoplastic starch, and a coupling agent (for example, an ionic compound) to produce a high-frequency-welded article. U.S. Pat. No. 6,100,335 discloses polymeric compositions based on blends of propylene polymer, ethylene-vinyl acetate copolymer (EVA), and organic peroxide, for use for high-frequency weldable sheets.

U.S. Publication 2004/0077791 discloses a high-frequency weldable, thermoplastic rubber composition comprising the following: (A) a thermoplastic rubber comprising (i) a rubber; and (ii) a thermoplastic polyolefin homopolymer or copolymer; and (B) a polar-modifier, in an amount effective to render the thermoplastic rubber composition high-frequency weldable, and wherein the polar modifier is selected from the group consisting of the following: (i) thermoplastic polyurethane resins in an amount of at least about 25 wt %, (ii) chlorinated polyolefin resins, (iii) copolymers of ethylene and vinyl acetate, (iv) terpolymer of styrene, butadiene and acrylonitrile, or (v) mixtures thereof.

U.S. Pat. No. 5,399,396 discloses RF-weldable multi-layered films, which have a barrier layer and a seal layer. The composition of the seal polymer layer is polymer derived of ethylene and ethylenically unsaturated ester (vinyl acetate (VA) or acrylate). The seal layer has an anti-block matted surface. U.S. Pat. No. 5,135,785 discloses pouches and films which contain of at least one barrier layer of a polyolefin, and at least one seal layer of ethylene-vinyl acetate. The seal layers are disclosed as weldable using radio frequency welding.

International Publication No. WO 93/24568 discloses a polymer article prepared by the process comprising the steps of: (1) blending polymer composition comprising the following: (A) at least one ethylene vinyl acetate copolymer, (B) at least one propylene ethylene copolymer, and (C) (1) from about 0.01% to about 5%, by weight, of a cross-linking agent, (2) from about 0.1% to about 35%, by weight, of one or more polymers selected from: (i) at least one co-, or terpolymer of at least one vinyl aromatic compound, (ii) at least one co-, or terpolymer of an alpha-olefin, and at least one monomer selected from the group consisting of an acrylic acid, an acrylic ester, a vinyl silane, and a vinyl alcohol, (iii) at least one polyolefin other than a propylene homopolymer or a propylene-ethylene copolymer, (iv) at least one polyetheramide block copolymer, (v) at least one ionomer, (vi) at least one oxidized polyolefin wax, or mixtures of (1) or (2); and forming the polymer composition into the article. The polymer articles are disclosed as being radio frequency weldable.

JP10219048A (English Abstract) discloses a polypropylene composition comprising the following: (A) 0.1-5 pts.wt. of metal oxide particles, (B) 0.1-5 pts.wt. of ion-substituted zeolite and (C) 100 pts.wt. of polypropylene. The composition is disclosed as having high frequency welding property, an antibacterial property, and a UV light-shielding property, and capable of exhibiting excellent light transmittance, by adding ultrafine zeolite particles and ultrafine metal oxide particles as crystal nucleus-forming agents to polypropylene resin.

WO2002/088229 discloses an HF responsive composition comprising the following: (A) a molecular sieve material, and (B) at least one interpolymer comprising (i) polymer units derived from at least one aliphatic olefin monomer having from 2 to 20 carbon atoms; and (ii) polymer units derived from (a) at least one vinyl or vinylidene aromatic monomer, or (b) from at least one sterically hindered aliphatic or cycloaliphatic vinyl or vinylidene monomer, or (c) from a combination of at least one vinyl or vinylidene aromatic monomer and at least one sterically hindered aliphatic or cycloaliphatic vinyl or vinylidene monomer, and optionally (d) polymer units derived from at least one ethylenically unsaturated polymerizable monomer, other than that derived from (a), (b) or (c).

There is an increasing need to replace materials that are perceived as less "environmentally safe," like PVC, with those that are more "environmentally safe," such as olefin-based polymers. However, olefin-based polymers are typically non-polar polymers, and therefore, are not radio frequency active. Also olefin-based polymers typically have high fuel numbers, which makes them very flammable. There is a further need to develop olefin-based compositions which are RF weldable and have good flame retardancy (for example, can pass a stringent flame retardancy test such as NFPA 701). These needs have been met by the following invention.

SUMMARY OF THE INVENTION

The invention provides a composition comprising at least the following components:

A) a first composition comprising a first ethylene-based interpolymer, and where the first composition has a density less than, or equal to, 0.91 g/cc, and a melt index (I2) from 6.0 to 20.0 g/10 min;

B) optionally, at least one filler that is capable of being excited by an alternating electromagnetic field at a frequency greater than, or equal to, 10 MHz;

C) at least one flame retardant selected from the following:
  i) from 30.0 to 50.0 wt % of one or more non-halogen, inorganic flame retardant compounds, based on the weight of the composition; or
  ii) from 8.0 to 30.0 wt % of one or more halogen-containing flame retardant compounds, based on the weight of the composition; and D) at least one polar polymer.

DETAILED DESCRIPTION

As discussed above, the invention provides a composition comprising at least the following components:

A) a first composition comprising a first ethylene-based interpolymer, and where the first composition has a density less than, or equal to, 0.91 g/cc, and a melt index (I2) from 6.0 to 20.0 g/10 min;

B) optionally, at least one filler that is capable of being excited by an alternating electromagnetic field at a frequency greater than, or equal to, 10 MHz;

C) at least one flame retardant selected from the following:
  i) from 30.0 to 50.0 wt %, further from 32.0 to 48.0 wt %, further from 35.0 to 46.0 wt % of one or more non-halogen, inorganic flame retardant compounds, based on the weight of the composition; or
  ii) from 8.0 to 30.0 wt %, further from 8.5 to 25.0 wt %, further from 9.0 to 20.0 wt %, of one or more halogen-containing flame retardant compounds, based on the weight of the composition; and D) at least one polar polymer.

An inventive composition may comprise two or more embodiments as described herein.

Component A may comprise two or more embodiments described herein.

Component B may comprise two or more embodiments described herein.

Component C may comprise two or more embodiments described herein.

Component D may comprise two or more embodiments described herein. As used herein, a "polar polymer" refers to a polymer comprising a chemical group comprising at least one heteroatom. Some examples of heteroatoms include O, N and Cl.

In one embodiment, the polar polymer is selected from the following: an ethylene vinyl acetate (EVA) copolymer, a chlorinated polyethylene, a maleic anhydride functionalized olefin-based polymer (for example, a maleic anhydride functionalized ethylene-based polymer, and further a maleic anhydride grafted ethylene-based polymer), an ethylene acrylic acid copolymer, an ethylene acrylate copolymer (for example, ethylene ethyl acrylate copolymer), an ethylene vinyl acetate carbon monoxide terpolymer, an ethylene acrylate carbon monoxide terpolymer (for example, ethylene n-butyl acrylate carbon monoxide terpolymer), or a combination thereof. In a further embodiment, component D is present in an amount from 10 to 50 wt %, further from 12 to 45 wt %, further from 15 to 40 wt %, based on the weight of the composition.

In one embodiment, the polar polymer is selected from the following: an ethylene vinyl acetate (EVA), a chlorinated ethylene-based polymer; a maleic anhydride functionalized olefin-based polymer (for example, a maleic anhydride functionalized ethylene-based polymer, and further a maleic anhydride grafted ethylene-based polymer), an ethylene acrylic acid copolymer; an ethylene acrylate copolymer, or a combination thereof. In a further embodiment, component D is present in an amount from 10 to 50 wt %, further from 12 to 45 wt %, further from 15 to 40 wt %, based on the weight of the composition.

In one embodiment, the polar polymer is selected from the following: an ethylene vinyl acetate (EVA), a chlorinated ethylene-based polymer; a maleic anhydride functionalized olefin-based polymer (for example, a maleic anhydride functionalized ethylene-based polymer, and further a maleic anhydride grafted ethylene-based polymer), or a combination thereof. In a further embodiment, component D is present in an amount from 10 to 50 wt %, further from 12 to 45 wt %, further from 15 to 40 wt %, based on the weight of the composition.

In one embodiment, component D is present in an amount from 10 to 50 wt %, further from 12 to 45 wt %, further from 15 to 40 wt %, based on the weight of the composition.

In one embodiment, the polar polymer is selected from the following: a) an ethylene vinyl acetate (EVA) copolymer, and a maleic anhydride functionalized ethylene-based polymer, and further a maleic anhydride grafted ethylene-based polymer, or a chlorinated ethylene-based polymer. In a further embodiment, the weight ratio of the maleic anhydride functionalized ethylene-based polymer to the ethylene vinyl acetate is from 0.40 to 0.80, further from 0.50 to 0.70.

In one embodiment, the first composition has a melt index (I2) from 6.0 to 18.0 g/10 min, or from 6.0 to 15.0 g/10 min, or from 6.0 to 12.0 g/10 min, or from 6.0 to 10.0 g/10 min, or from 6.5 to 10.0 g/10 min.

In one embodiment, the first composition has a melt index (I2) from 7.0 to 20.0 g/10 min, or from 7.0 to 15.0 g/10 min, or from 7.0 to 12.0 g/10 min, or from 7.0 to 10.0 g/10 min, or from 7.5 to 10.0 g/10 min.

In one embodiment, the first composition has a melt index (I2) from 6.0 to 20.0 g/10 min, further from 6.2 to 20.0 g/10 min, further from 6.4 to 20.0 g/10 min, further from 7.0 to 20.0 g/10 min; further from 6.0 to 15.0 g/10 min, further from 6.2 to 12.0 g/10 min, further from 6.4 to 10.0 g/10 min, further from 7.0 to 10.0 g/10 min.

In one embodiment, the first composition has a density less than, or equal to, 0.91 g/cc, further from 0.86 to 0.91 g/cc, further from 0.86 to 0.90 g/cc, further from 0.87 to 0.90 g/cc.

In one embodiment, the first composition has a density less than, or equal to, 0.91 g/cc, further from 0.86 to 0.91 g/cc, further from 0.86 to 0.90 g/cc, further from 0.87 to 0.90 g/cc; and a melt index (I2) from 6.0 to 20.0 g/10 min, further from 6.2 to 20.0 g/10 min, further from 6.4 to 20.0 g/10 min, further from 7.0 to 20.0 g/10 min; further from 6.0 to 15.0 g/10 min, further from 6.2 to 12.0 g/10 min, further from 6.4 to 10.0 g/10 min, further from 7.0 to 10.0 g/10 min.

In one embodiment, the first composition has a density less than, or equal to, 0.91 g/cc, further from 0.86 to 0.91 g/cc, further from 0.86 to 0.90 g/cc, further from 0.87 to 0.90 g/cc; and a melt index (I2) from 6.0 to 20.0 g/10 min, further from 6.2 to 20.0 g/10 min, further from 6.3 to 20.0 g/10 min, further from 6.4 to 20.0 g/10 min, further from 7.0 to 20.0 g/10 min, further from 7.5 to 15.0 g/10 min, further from 8.0 to 12.0 g/10 min, further from 8.2 to 10.0 g/10 min.

In one embodiment, the first ethylene-based interpolymer is an ethylene/α-olefin copolymer or an ethylene/α-olefin block copolymer.

In one embodiment, the first ethylene-based interpolymer is an ethylene/α-olefin block copolymer. Suitable α-olefins include C3-C20 α-olefins, further C3-C10 α-olefins, further C4-C8 α-olefins.

In one embodiment, the first ethylene-based interpolymer is an ethylene/α-olefin copolymer. Suitable α-olefins include C3-C20 α-olefins, further C3-C10 α-olefins, further C4-C8 α-olefins.

In one embodiment, the first ethylene-based interpolymer has a density from 0.860 to 0.910 g/cc, further from 0.865 to 0.908 g/cc, further from 0.870 to 0.905 g/cc (1 cc=1 cm$^3$).

In one embodiment, the first ethylene-based interpolymer has a melt index (I2) from 0.1 to 30.0 g/10 min, further from 0.5 to 20.0 g/10 min, further from 1 to 10.0 g/10 min.

In one embodiment, the first ethylene-based interpolymer is present in an amount from 5.0 to 35.0 wt %, further from 7.0 to 30.0 wt %, further from 9.0 to 25.0 wt %, based on the weight of the composition.

In one embodiment, the composition comprises component B.

In one embodiment, the filler of component B is a zeolite.

In one embodiment, the filler is excited by alternating electromagnetic field at a frequency from 10 MHz to 50 MHz. In a further embodiment, the filler is a zeolite.

In one embodiment, component B is present in an amount from 10 to 30 wt %, further from 12 to 25 wt %, further from 15 to 22 wt %, based on the weight of the composition. In a further embodiment, the filler is a zeolite.

In one embodiment, the first composition further comprises a second ethylene-based interpolymer. In a further embodiment, the second ethylene-based interpolymer is an ethylene/α-olefin copolymer or an ethylene/α-olefin block copolymer.

In one embodiment, the second ethylene-based interpolymer has a density from 0.860 to 0.910 g/cc, further from 0.865 to 0.905 g/cc, further from 0.870 to 0.900 g/cc.

In one embodiment, the second ethylene-based interpolymer has a melt index (I2) from 7.0 to 30.0 g/10 min, further from 10.0 to 25.0 g/10 min, further from 12.0 to 20.0 g/10 min.

In one embodiment, the second ethylene-based interpolymer is present in an amount from 5.0 to 35.0 wt %, further from 7.0 to 30.0 wt %, further from 9.0 to 25.0 wt %, based on the weight of the composition.

In one embodiment, the weight ratio of the first ethylene-based interpolymer to the second ethylene-based interpolymer is from 0.8 to 1.2, further from 0.9 to 1.1.

In one embodiment, the density ratio of the first ethylene-based interpolymer to the second ethylene-based interpolymer is from 0.8 to 1.2, further from 0.9 to 1.1.

In one embodiment, the I2 ratio of the first ethylene-based interpolymer to the second ethylene-based polymer is from 0.10 to 0.60, further from 0.15 to 0.40.

In one embodiment, the melting point (Tm) ratio of the first ethylene-based interpolymer to the second ethylene-based polymer is from 1.00 to 1.35, further from 1.01 to 1.30.

The first ethylene-based interpolymer may comprise a combination of two or more embodiments described herein.

The second ethylene-based interpolymer may comprise a combination of two or more embodiments described herein.

In one embodiment, the first composition, of component A, has a density from 0.860 to 0.890 g/cc, further from 0.865 to 0.885 g/cc, further from 0.870 to 0.880 g/cc.

In one embodiment, the first composition comprises greater than, or equal to, 90 wt %, further greater than, or equal to, 95 wt %, further greater than, or equal to, 0.98 wt % of the first ethylene-based interpolymer, based on the weight of the composition.

In one embodiment, the first composition comprises greater than, or equal to, 90 wt %, further greater than, or equal to, 95 wt %, further greater than, or equal to, 0.98 wt % of the sum weight of the first ethylene-based interpolymer and the second ethylene-based interpolymer, based on the weight of the composition.

The first composition of component A may comprise a combination of two or more embodiments described herein.

In one embodiment, the composition has a density from 1.1 to 1.5 g/cc, further from 1.2 to 1.4 g/cc.

In one embodiment, the composition has an I2 from 0.05 to 2.0 g/10 min, further from 0.08 to 1.5 g/10 min, further from 0.10 to 1.2 g/10 min.

In one embodiment, the composition has an I10 from 2.0 to 20.0, further from 3.0 to 15.0 g/10 min.

In one embodiment, the composition has an I10/I2 from 10 to 50, further from 10 to 45, further from 10 to 40.

In one embodiment, the composition has a % mass loss (NFPA 701 test method) less than, or equal to, 40 wt %, further less than, or equal to, 30 wt %, further less than, or equal to, 20 wt %, further less than, or equal to, 10 wt %.

In one embodiment, the composition has a % mass loss (NFPA 701 test method) less than, or equal to, 5.0 wt %, further less than, or equal to, 3.0 wt %, further less than, or equal to, 2.0 wt %.

In one embodiment, the composition has a % mass loss (NFPA 701 test method) less than, or equal to, 1.8 wt %, further less than, or equal to, 1.5 wt %, further less than, or equal to, 1.0 wt %, further less than, or equal to, 0.5 wt %.

In one embodiment, the composition has a melting point (Tm) greater than, or equal to, 110° C., further greater than, or equal to, 115° C., further greater than, or equal to, 120° C.

In one embodiment, the composition has a melting point (Tm) less than, or equal to, 135° C., further less than, or equal to, 130° C., further less than, or equal to, 125° C.

In one embodiment, the composition has a Delta H melt from 10.0 to 40.0 J/g, further from 12.0 to 35.0 J/g, further from 15.0 to 32.0 J/g.

In one embodiment, the composition has a VICAT temperature from 35.0 to 60.0° C., further from 48.0° C. to 58.0° C.

In one embodiment, the composition has a Shore A Hardness from 68 to 95, further from 70 to 92.

In one embodiment, the weight ratio of component A to component D is from 1.00 to 1.40, further from 1.02 to 1.35, further from 1.05 to 1.30.

In one embodiment, the composition comprises component B, and wherein the weight ratio of component A to component B is from 1.00 to 1.50, further from 1.05 to 1.45.

In one embodiment, the weight ratio of component A to component C is from 0.30 to 0.80, further from 0.35 to 0.75, further from 0.40 to 0.70.

In one embodiment, the composition comprises, as component C), from 30.0 to 50.0 wt % of one or more non-halogen, inorganic flame retardant. In a further embodiment, the weight ratio of component A to component C is from 0.30 to 0.80, further from 0.35 to 0.75, further from 0.40 to 0.70.

In one embodiment, the composition comprises, as component C, from 8.0 to 30.0 wt % of one or more halogen-containing flame retardant compounds, based on the weight of the composition. In a further embodiment, the weight ratio is from 1.50 to 6.50, further from 1.70 to 6.00, further from 1.90 to 5.50. In a further embodiment, the weight ratio of component A to component C is from 1.50 to 3.50, further from 1.70 to 3.00, further from 1.90 to 2.80.

The inventive composition may comprise two or more embodiments described herein.

The invention also provides an article comprising at least one component formed from an inventive composition described herein. In a further embodiment, the article is a coated substrate, and wherein the coating is formed from an inventive composition.

Ethylene-Based Interpolymer (Component A)

In one embodiment, the first ethylene-based interpolymer has a density from 0.865 to 0.910 g/cc, further from 0.870 to 0.905 g/cc.

In one embodiment, the first ethylene-based interpolymer has a molecular weight distribution (MWD) from 1.2 to 4.0, further from 1.5 to 3.8, further from 1.8 to 3.0, further from 2.0 to 2.8.

In one embodiment, the first ethylene-based interpolymer has a melt index (I2) from 0.5 to 20.0 g/10 min, further from 1.0 to 15.0 g/10 min, further from 2.0 to 10.0 g/10 min.

In one embodiment, first ethylene-based interpolymer has a melting point of greater than, or equal to, 90° C., further greater than, or equal to, 92° C., further greater than, or equal to, 95° C.

In one embodiment, first ethylene-based interpolymer has a melting point of less than, or equal to, 135° C., further less than, or equal to, 130° C., further less than, or equal to, 125° C.

The first ethylene-based interpolymer may comprise a combination of two or more embodiments described herein.

Ethylene/α-Olefin Interpolymer (Component A)

In one embodiment, the first ethylene-based interpolymer is an ethylene/α-olefin interpolymer, and further an ethylene/α-olefin copolymer. Suitable α-olefins include C3-C20 α-olefins, further C3-C10 α-olefins, and further C3, C4, C6 and C8 α-olefins.

In one embodiment, the ethylene-based interpolymer is a homogeneously branched linear ethylene/α-olefin copolymer, or a homogeneously branched substantially linear ethylene/α-olefin copolymer. Suitable α-olefins include C3-C20 α-olefins, further C3-C10 α-olefins, and further C3, C4, C6 and C8 α-olefins The terms "homogeneous" and "homogeneously-branched" as used in reference to an ethylene/α-olefin copolymer, refers to a copolymer in which the α-olefin comonomer is randomly distributed within a given polymer molecule, and all of the polymer molecules have the same or substantially the same comonomer/ethylene ratio. The homogeneously branched ethylene/α-olefin copolymers include homogeneously branched linear ethylene/α-olefin copolymers, and homogeneously branched substantially linear ethylene/α-olefin copolymers.

Included among the homogeneously branched linear ethylene/α-olefin copolymers are ethylene copolymers, which lack long chain branching (or measurable amounts of long chain branching), but do have short chain branches, derived from the comonomer polymerized into the copolymer, and which comonomer is homogeneously distributed, both within the same polymer chain, and between different polymer chains. That is, homogeneously branched linear ethylene/α-olefin copolymers lack long chain branching, just as is the case for the linear low density ethylene/α-olefin copolymers, and can be made using "uniform branching distribution" polymerization processes, as described, for example, by Elston in U.S. Pat. No. 3,645,992. Commercial examples of homogeneously branched linear ethylene/α-olefin copolymers include TAFMER polymers supplied by the Mitsui Chemical Company, and EXACT polymers supplied by the ExxonMobil Chemical Company.

The homogeneously branched substantially linear ethylene/α-olefin copolymers are described in, for example, U.S. Pat. Nos. 5,272,236; 5,278,272; 6,054,544; 6,335,410 and 6,723,810; each fully incorporated herein by reference. The substantially linear ethylene/α-olefin copolymers are those in which the comonomer is randomly distributed within a given polymer molecule, and in which all of the polymer molecules have the same or substantially the same comonomer/ethylene ratio. In addition, the substantially linear ethylene/α-olefin copolymers have long chain branching (chain branch has more carbon atoms than a branched formed by the incorporation of one comonomer into the polymer backbone). The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 total carbons. Polymers within this group include the ENGAGE and AFFINITY products available from The Dow Chemical Company. In contrast to the homogeneously branched substantially linear ethylene/α-olefin copolymers, the homogeneously branched linear ethylene/α-olefin copolymers lack measurable or demonstrable long chain branches.

The homogeneously branched substantially linear ethylene/α-olefin copolymers form a unique class of homogeneously branched ethylene polymers. They differ from the class of homogeneously branched linear ethylene/α-olefin copolymers, described by Elston in U.S. Pat. No. 3,645,992, and, moreover, they are not in the same class as conventional heterogeneous, "Ziegler-Natta catalyst polymerized" linear ethylene/α-olefin copolymers (for example, LLDPE, ULDPE and VLDPE), made, for example, using the technique disclosed by Anderson et al., in U.S. Pat. No. 4,076, 698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers.

The homogeneously branched, substantially linear ethylene/α-olefin copolymers have excellent processability, even though they have a relatively narrow molecular weight distribution. Surprisingly, the melt flow ratio (I10/I2), according to ASTM D 1238, of the substantially linear ethylene/α-olefin copolymers can be varied widely, and essentially independently of the molecular weight distribution (Mw/Mn or MWD). This surprising behavior is completely contrary to conventional homogeneously branched linear ethylene/α-olefin copolymers, such as those described, for example, by Elston in U.S. Pat. No. 3,645, 992, and heterogeneously branched "conventional Ziegler-Natta polymerized" linear ethylene/α-olefin copolymers, such as those described, for example, by Anderson et al., in U.S. Pat. No. 4,076,698. Unlike the substantially linear ethylene/α-olefin copolymers, linear ethylene/α-olefin copolymers (whether homogeneously or heterogeneously branched) have rheological properties, such that, as the molecular weight distribution increases, the I10/I2 value also increases.

"Long chain branching (LCB)" can be determined by conventional techniques known in the industry, such as 13C nuclear magnetic resonance (13C NMR) spectroscopy, using, for example, the method of Randall (Rev. Micromole. Chem. Phys., 1989, C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301(1949), and Rudin, A., Modern Methods of Polymer Characterization, John Wiley & Sons, New York (1991) pp. 103-112.

The homogeneously branched ethylene/α-olefin copolymers will preferably have a single melting peak, as measured using Differential Scanning calorimetry (DSC), in contrast to heterogeneously branched ethylene/α-olefin copolymers, which have two or more melting peaks, due to the heterogeneously branched polymer's broad short chain branching distribution.

In one embodiment, the ethylene/α-olefin interpolymer, and further copolymer, has a melt index (I2) from 0.1 to 30 g/10 min, further from 0.2 to 15 g/10 min, further from 0.5 to 10 g/10 min, further from 1 to 6 g/10 min (at 190° C./2.16 kg). All individual values and subranges from 0.1 to 30 g/10 minutes are included herein and disclosed herein; for example, the melt flow rate can be from a lower limit of 0.1 g/10 minutes, 0.2 g/10 minutes, 0.3 g/10 minutes, 0.4 g/10 minutes, 0.5 g/10 minutes, 0.7 g/10 minutes, 0.8 g/10 minutes, or 1.0 g/10 minutes to an upper limit of 30 g/10 minutes, 25 g/10 minutes, 20 g/10 minutes, 15 g/10 minutes, 10 g/10 minutes, or 6 g/10 minutes. For example, the ethylene/α-olefin interpolymer, and further copolymer, may have a melt flow rate in the range of from 0.1 to 25 g/10 minutes; or from 0.2 to 20 g/10 minutes; or from 0.3 to 15 g/10 minutes; or from 0.4 to 12 g/10 minutes; or from 0.5 to 10 g/10 minutes; or from 0.5 to 5 g/10 minutes.

In one embodiment, the ethylene/α-olefin copolymer has a crystallinity from at least 10 percent by weight to 38 percent by weight. All individual values and subranges from 10 percent by weight to 38 percent by weight are included herein and disclosed herein; for example, the crystallinity can be from a lower limit of 10 percent by weight, 13 percent, or 18 percent by weight, to an upper limit of 38 percent by weight, 34 percent by weight, 31 percent by weight. For example, the ethylene/α-olefin copolymer may have a crystallinity in the range of from at least 13 percent by weight to 36 percent by weight; or in the alternative, from at least 16 percent by weight to 34 percent by weight.

The ethylene/α-olefin interpolymer, and further copolymer, comprises units derived from ethylene and polymeric units derived from an α-olefin comonomer. Suitable α-olefins include C3 to C10 α-olefins; and further C3, C4, C6 and C8 α-olefins.

An ethylene/α-olefin interpolymer, and further an ethylene/α-olefin copolymer, may comprise a combination of two or more embodiments as described herein.

Ethylene/α-Olefin Block Copolymer (Component A)

In one embodiment, the first ethylene-based interpolymer is an ethylene/α-olefin block copolymer, as described below.

As used herein, the terms "ethylene/α-olefin block copolymer," "ethylene/olefin block copolymer," or "OBC," refer to an ethylene/α-olefin multi-block copolymer, and includes ethylene and one or more copolymerizable α-olefin comonomers in polymerized form, characterized by multiple blocks or segments of two or more polymerized monomer units, differing in chemical or physical properties. The terms "interpolymer" and "copolymer" are used interchangeably, herein, for the term ethylene/α-olefin block copolymer, and similar terms discussed in this paragraph. When referring to amounts of "ethylene" or "comonomer" in the copolymer, it is understood that this means polymerized units thereof. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer, which is preferably an α-olefin having 3 or more carbon atoms. Suitable α-olefins are described above. In some embodiments, the olefin block copolymer may comprise from 50 mol % to 90 mol % ethylene, preferably from 60 mol % to 85 mol % ethylene, more preferably from 65 mol % to 80 mol % ethylene. For many ethylene/octene block copolymers, the preferred composition comprises an ethylene content greater than 80 mole percent of the whole polymer and an octene content from 10 to 15, preferably from 15 to 20 mole percent of the whole polymer.

As discussed above, the olefin block copolymer (OBC) includes various amounts of "hard" and "soft" segments. "Hard" segments are blocks of polymerized units, in which ethylene is present in an amount greater than 95 weight percent, or greater than 98 weight percent, based on the weight of the polymer, up to 100 weight percent. In other words, the comonomer content (content of monomers other than ethylene) in the hard segments is less than 5 weight percent, or less than 2 weight percent, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, or greater than 10 weight percent, or greater than 15 weight percent, based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent, and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al., and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer (OBC) is a polymer comprising two or more chemically distinct regions or segments (referred to as "blocks") preferably joined in a linear manner, that is, a polymer comprising chemically differentiated units, which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In one embodiment, the ethylene/α-olefin block copolymer, is produced in a continuous process, and possesses a polydispersity index, PDI (or MWD), from 1.7 to 3.5, or from 1.8 to 3.0, or from 1.8 to 2.5, or from 1.8 to 2.2. When produced in a batch or semi-batch process, the OBC possesses PDI from 1.0 to 3.5, or from 1.3 to 3.0, or from 1.4 to 2.5, or from 1.4 to 2.0.

In addition, the olefin block copolymer possesses a PDI fitting a Schultz-Flory distribution, rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In one embodiment, the present ethylene/α-olefin block copolymer possesses a most probable distribution of block lengths.

In one embodiment, the ethylene/α-olefin block copolymer has at least one of the following properties:

(A) Mw/Mn from 1.7 to 3.5, at least one melting point, $T_m$, in degrees Celsius, and a density, d, in grams/cubic centimeter, where in the numerical values of $T_m$ and d correspond to the relationship:

$$T_m > -2002.9 + 4538.5(d) - 2422.2(d)^2, \text{ and/or}$$

(B) Mw/Mn from 1.7 to 3.5, and is characterized by a heat of fusion, ΔH in J/g, and a delta quantity, ΔT, in degrees Celsius, defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase: Re>1481-1629(d); and/or (D) has a molecular fraction which elutes between 40° C. and 130° C. when fractionated using TREF, characterized in that the fraction has a molar comonomer content greater than, or equal to, the quantity (−0.2013) T+20.07, more preferably greater than, or equal to, the quantity (−0.2013) T+21.07, where T is the numerical value of the peak elution temperature of the TREF fraction, measured in ° C.; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/α-olefin block copolymer may also have at least one of the following properties:

(F) a molecular fraction which elutes between 40° C. and 130° C. when fractionated using TREF, characterized in that the fraction has a block index of at least 0.5 and up to 1, and a molecular weight distribution, Mw/Mn, greater than 1.3; and/or (G) average block index greater than zero and up to 1.0, and a molecular weight distribution, Mw/Mn greater than 1.3.

It is understood that the ethylene/α-olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

In one embodiment, the ethylene/α-olefin block copolymer has at least one of the following properties A through E above.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In one embodiment, the ethylene/α-olefin block copolymer has a density of from 0.850 g/cc to 0.900 g/cc, or from 0.855 g/cc to 0.890 g/cc or from 0.860 g/cc to 0.880 g/cc. In a further embodiment, the ethylene/α-olefin block copolymer has a melt index (MI or I2) from 0.5 g/10 min to 40 g/10 min, or from 0.8 g/10 min to 30 g/10 min, or from 1.0 g/10 min to 20 g/10 min, or from 1.0 g/10 min to 10 g/10 min, as measured by ASTM D 1238 (190° C./2.16 kg). In one embodiment, the ethylene/α-olefin block copolymer comprises polymerized ethylene and one α-olefin as the only monomer types. In a further embodiment, the α-olefin is selected from propylene, 1-butene, 1-hexene or 1-octene.

In one embodiment, the ethylene/α-olefin block copolymer excludes styrene.

The ethylene/α-olefin block copolymers can be produced via a chain shuttling process, such as described in U.S. Pat. No. 7,858,706, which is herein incorporated by reference. In particular, suitable chain shuttling agents and related information are listed in Col. 16, line 39, through Col. 19, line 44. Suitable catalysts are described in Col. 19, line 45, through Col. 46, line 19, and suitable co-catalysts in Col. 46, line 20, through Col. 51 line 28. The process is described throughout the document, but particularly in Col. 51, line 29, through Col. 54, line 56. The process is also described, for example, in the following: U.S. Pat. No. 7,608,668; U.S. Pat. Nos. 7,893,166; and 7,947,793.

The ethylene/α-olefin block copolymer may comprise a combination or two or more embodiments described herein.

Polar Polymer (Component D)

A polar polymer is a polymer that comprises at least one chemical group that comprises at least one heteroatom, for example, O, N, or Cl.

In one embodiment, the polar polymer comprises greater than, or equal to, 0.5 wt %, further greater than, or equal to, 1.0 wt %, further greater than, or equal to, 2.0 wt %, further greater than, or equal to, 5.0 wt %, based on the weight of the polar polymer, of the at least one chemical group comprising at least one heteroatom.

In one embodiment, the polar polymer comprises greater than, or equal to, 10 wt %, further greater than, or equal to, 12 wt %, further greater than, or equal to, 15 wt %, further greater than, or equal to, 20 wt %, based on the weight of the polar polymer, of the at least one chemical group comprising at least one heteroatom.

In one embodiment, the polar polymer is present in an amount from greater than 0 to 30 wt %, preferably from 2 to 30 wt %, still more preferably from 5 to 25 wt %, based on the weight of the composition.

In one embodiment, the polar polymer is selected from the following: an ethylene vinyl acetate (EVA) copolymer, a chlorinated ethylene-based polymer, a maleic anhydride functionalized olefin-based polymer, an ethylene acrylic acid copolymer, an ethylene acrylate copolymer (for example, ethylene ethyl acrylate), an ethylene vinyl acetate carbon monoxide terpolymer, an ethylene acrylate carbon monoxide terpolymer, or a combination thereof.

Chlorinated ethylene-based polymers are produced, for example, by combining chlorine and an ethylene-based polymer (for example, HDPE) in an aqueous slurry. In one embodiment, the chlorine content of the polymer is from 25 wt % to 50 wt %, further from 30 wt to 40 wt %, based on the weight of the chlorinated ethylene-based polymer.

A polar polymer may comprise a combination of two or more embodiments as described herein.

Filler (Component B)

In one embodiment, the filler is a zeolite. In a further embodiment, the filler is present in an amount from 5 to 30 wt %, further from 10 to 25 wt %, based on the weight of the composition. The zeolite has HF (High Frequency; ≥10 MHz) responsiveness. Such materials are inorganic solid materials characterized by a porous structure, which is formed by channels or pores. The pores may be non-uniform with varying pore diameters, or uniform with constant pore diameters. The porous structure provides for a large internal surface area with adsorptive capacity for molecular species, which are capable of entering the pores, such as water molecules. The pores may penetrate essentially the entire volume of the solid material.

In one embodiment, the zeolite is selected from synthetic or natural crystalline metal aluminosilicates. In a further embodiment, the zeolite has channels of diameters less than 1.2 nanometers (nm). Zeolites may also be referred to as framework aluminosilicates, because the framework is based on a three-dimensional network of $[(Al, Si)_4]$ tetrahedral which are linked to each other (at the corners) by shared oxygen atoms. Substitution of aluminum for silicon generates a charge imbalance, requiring the inclusion of a cation. In the hydrated form, zeolites of the most important aluminosilicate variety, as represented by the formula $$M_x[(AlO_2)_x(SiO_2)_y]zH_2O,$$

wherein M represents a cation of valence n, x is the number of aluminum-based tetrahedral and charge balancing cations in the unit cell, y is the number of silicon-based tetrahedra in the unit cell, and z is the number of water molecules in the zeolite pores. The bracketed part of the formula $[(AlO_2)_x(SiO_2)_y]$ represents the anionic framework composition. The sum (x+y) is the total number of tetrahedral in the unit cell. The ratio y/x may vary depending on the type of zeolite, and typically has values of from about 1 to about 6, depending upon the structure. Occlusion of $AlO_2$-anions may result in a ratio of below 1.

The framework contains channels and voids which can be occupied by the cations M and water molecules. The water molecules may be reversibly removed, for example, by the application of heat. The cation M may be a Group IA element or a Group IIA element, that is, it may be an alkali metal cation or an alkaline-earth metal cation. In preferred, but non-limiting embodiments, typically, M is selected from the group consisting of sodium, potassium, calcium, magnesium, strontium and barium, more preferably sodium, potassium, and calcium.

Suitable synthetic zeolites include those within the family of Type X, 3A, 4A and 5A. The specifically exemplified zeolite grades have a pore size in the range of from about 0.3 nm to about 0.8 nm, and a particle size in the range of from about 2 microns (μm) to about 16 μm. For the purpose of the present invention, the zeolites may advantageously be used as (commercially) supplied, in particular, in the supplied form and hydration state. Prior treatment or activation, e.g., to remove adsorbed water, is not considering necessary. Advantageously, the zeolites are used in powder form.

It is within the scope of the present invention that more than one zeolite may be used in the inventive compositions, i.e., a mixture of two or more different zeolites.

In one embodiment, the zeolite (or mixture of zeolites) is present in an amount of at least 5 weight percent (wt %), preferably from 5 wt % to 30 wt %, further from 10 wt % to 25 wt %, and further from 12 wt % to 20 wt %, based on the weight of the composition.

The zeolite may be incorporated using any means conventionally useful to ensure formation of a uniform dispersion of the zeolite throughout the composition. For example, impeller mixing, rotary mixing, Banbury mixers, twin screw extruders and other such devices. An article formed from an inventive composition, e.g., a sheet, film, or compression or injection molded article, as appropriate, may then be carried into a high frequency electromagnetic field for dielectric heating including, as desired, HF welding or HF sealing of one or more components of the article, to prepare an intermediary or a final fabricated article.

In one embodiment, water is present in the zeolite, in an amount relative to the zeolite weight, ranging from 1 wt % to 21 wt %, further from 2 wt % to 19 wt %, further from 3 wt % to 18 wt %, and further from 3 wt % to 17 wt %, based on the weight of the zeolite. This water is generally present within, or absorbed onto, the zeolite, as supplied, but it can also be ensured and controlled by drying the zeolite to the required water level. The amount of water is measured as Loss on Ignition (LOI), which is weight loss at 575° C. for one hour.

In one embodiment, the zeolite is a synthetic zeolite within the family of Type X, 3A, 4A or 5A. In a further embodiment, the synthetic zeolite is within the family of Type 4A or 5A.

Flame Retardants (Component C)

Flame retardant materials, as known in the art, are chemical compounds, or mixtures of chemical compounds, which do not ignite readily or propagate flames under small to moderate fire exposures. Flame Retardant reduces the intensity and spread of fire. A flame retardant reduces smoke and toxic by-products of combustion.

Flame retardants include non-halogen, inorganic flame retardant compounds, including, but not limited to, metal hydrates and metal oxides. Examples of non-halogen, inorganic flame retardants include Aluminum Trihydrate (ATH), Magnesium Hydroxide (MDH) (ground or precipitated grades), and Antimony Trioxide.

Flame retardants also include halogen-containing flame retardants compounds. Halogen-containing flame retardant compounds include, but are not limited to, halogenated aryl compounds, further brominated aryl compounds. Examples include brominated imide compounds, brominated bis-imide compounds, and brominated ether compounds. Further examples include brominated bis-phthalimide compounds, brominated diphenyl ether compounds and brominated bis-phenol compounds.

A flame retardant may comprise a combination of two or more embodiments described herein.

Additives

An inventive composition may comprise one or more additives. Additives include, but are not limited to, antioxidants, ultraviolet absorbers, antistatic agents, colorants (e.g., titanium dioxide, carbon black and pigments), viscosity modifiers, anti-block agents, release agents, coefficient of friction (COF) modifiers, thermal stabilizers, odor modifiers/absorbents, and any combination thereof.

In one embodiment, the composition further comprises an antioxidant, an ultraviolet absorber, a pigment, a thermal stabilizer, or combinations thereof.

In one embodiment, the inventive composition further comprises one or more additional polymers. Additional polymers include, but are not limited to, ethylene-based polymers and propylene-based polymers.

In one embodiment, the composition further comprises an olefin-based polymer (e.g., PP, RCP, HDPE).

Articles

The invention also provides an article comprising at least one component formed from an inventive composition. Articles include, but are not limited to, films, coatings, injection molded articles, thermoformed articles and foams. Additional articles include medical devices (e.g., pressure cuffs and stabilization devices); inflatable articles (e.g., toys, watercraft, cushioning and furniture), sheetings (e.g., awnings, banners, signs, tents, tarpaulins, and liners for pools, ponds or landfills), book bindings, and carriers (e.g., sporting bags and backpacks).

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise at least one comonomer.

The term, "ethylene-based polymer," as used herein, refers to a polymer that comprises, in polymerized form, a majority amount of ethylene monomer (based on the weight of the polymer), and optionally may comprise at least one comonomer.

The term, "ethylene-based interpolymer," as used herein, refers to an interpolymer that comprises, in polymerized form, a majority amount of ethylene monomer (based on the weight of the interpolymer), and at least one conomomer.

The term, "ethylene-based copolymer," as used herein, refers to a copolymer that comprises, in polymerized form, a majority amount of ethylene monomer (based on the weight of the copolymer), and a comonomer, as the only two monomer types.

The term, "ethylene/α-olefin interpolymer," as used herein, refers to an interpolymer that comprises, in polymerized form, a majority amount of ethylene monomer (based on the weight of the interpolymer), and at least one α-olefin. This term does not include the ethylene/α-olefin block copolymers discussed above.

The term, "ethylene/α-olefin copolymer," as used herein, refers to a copolymer that comprises, in polymerized form, a majority amount of ethylene monomer (based on the weight of the copolymer), and an α-olefin, as the only two monomer types. This term does not include the ethylene/α-olefin block copolymers discussed above.

The term "propylene-based polymer," as used herein, refers to a polymer that comprises, in polymerized form, a majority amount of propylene monomer (based on the weight of the polymer) and optionally may comprise at least one comonomer.

Test Methods

Density: Measurements are made using ASTM D792, Method B. Five measurements were made, and the average reported.

Melt index (or I2, I2 or MI) for an ethylene-based polymer (pellet form), or an ethylene-based polymer blend (e.g., two ethylene-based polymers in a first composition) was measured in accordance with ASTM D 1238, Condition 190° C./2.16 kg, and is reported in grams eluted per 10 minutes. Three measurements were made, and the average reported. The $I_{10}$ (or I10) was measured in accordance to ASTM D-1238, Condition 190° C./10 kg load, and is reported in g/10 min. Three measurements were made, and the average reported.

Differential Scanning Calorimetry

Differential Scanning calorimetry (DSC) is used to measure crystallinity in ethylene (PE, or OBC) based samples and propylene (PP) based samples. About five to eight milligrams of sample is weighed, and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (e.g., for PE, % cryst.=(Hf/292 J/g)×100; and for PP, % cryst.=(Hf/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak $T_c$).

Gel Permeation Chromatography

The Gel Permeation Chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4-trichlorobenzene. The samples are prepared at a concentration of "0.1 grams of polymer in 50 milliliters of solvent containing 200 ppm of butylated hydroxytoluene (BHT)." Samples are prepared by agitating lightly for two hours at 160° C. The injection volume is 100 microliters and the flow rate is 1.0 ml/minute.

Calibration of the GPC column set is performed with 21 narrow molecular weight distribution polystyrene standards, with molecular weights ranging from 580 to 8,400,000, arranged in six "cocktail" mixtures, with at least a decade of separation between individual molecular weights. The standards are purchased from Polymer Laboratories (Shropshire, UK). The polystyrene standards are prepared at "0.025 grams in 50 milliliters of solvent" for molecular weights equal to, or greater than, 1,000,000, and at "0.05 grams in 50 milliliters of solvent" for molecular weights less than 1,000,000. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)): Mpolyethylene=0.431(Mpolystyrene). Polyethylene equivalent molecular weight calculations are performed using VISCOTEK TriSEC software Version 3.0.

Mechanical Properties

Tensile Properties (10% Modulus, 20% modulus, 30% Modulus; Strain at Break; Stress at Break; Flexural Modulus) were measure on injection molded test samples—see Experimental section. The Tensile samples (ASTM D 638 Type I Tensile bar) were injection molded with AXXICON Mold Inserts. The test specimen dimensions are 165(6.5")×13(0.5")×3.2(0.125") mm. The average tensile properties were determined with five test specimens in accordance with ASTM D 638 (508 mm/min), and the average reported.

VICAT Softening Temperature

A test specimen was placed in the testing apparatus, so that the penetrating needle rested on its surface at least 1 mm from the edge. A load of 10N or 50N was applied to the specimen. The specimen was then lowered into an oil bath at 23 degrees C. The bath was raised at a rate of 120° C. per hour, until the needle penetrated 1 mm. The Vicat softening temperature is the temperature at which a flat-ended needle penetrates the specimen to the depth of 1 mm under a specific load. The temperature reflects the point of softening to be expected when a material is used in an elevated temperature application. The VICAT softening temperature was determined in accordance with ASTM D1525. Test samples were prepared by injection molding—see Experimental section. Injection molded sample dimensions were as follows: 80 mm×10 mm×4 mm (thickness). Five test samples tested, and the average was reported.

Shore A Hardness

Hardness measurements were taken with a Shore A type durometer. The durometer was placed onto a plaque of approximately 0.125 inch thickness, prepared by injection molding process. Test samples were injected molded—see Experimental section. Injection molded sample dimensions were as follows: 4 inch×6 inch×~0.125 inch (thickness). Five test samples tested, and the average was reported.

Experimental

Polymers used in this study are listed in Table 1 and Table 2 below. Flame retardants are listed in Table 3. Inorganic fillers are listed in Table 4, and other additives are listed in Table 5.

TABLE 1

Polymers

| Polymer | Density (g/cm3) | Melting Point (° C.) | MI (@190° C.) |
|---|---|---|---|
| INFUSE 9500* | 0.877 | 122 | 5.0 |
| INFUSE 9817** | 0.877 | 120 | 15.0 |
| ENGAGE 8450*** | 0.902 | 97 | 3.0 |
| ENGAGE 8411**** | 0.880 | 76 | 18.0 |

*First ethylene-based polymer (ethylene/octene block copolymer), available from The Dow Chemical Company.
**Second ethylene-based polymer (ethylene/octene block copolymer), available from The Dow Chemical Company.
***First ethylene-based polymer (ethylene/octene copolymer), available from The Dow Chemical Company.
****Second ethylene-based polymer (ethylene/octene copolymer), available from The Dow Chemical Company.

TABLE 2

Polar Polymers

| Polar Polymer | Melting Point (° C.) | Vinyl Acetate (VA) Content (wt %) or Chlorine (Cl) Content (wt %) |
|---|---|---|
| TYRIN 6000* | n/a | 35 (Cl) |
| LEVAPREN 500** |  | 50 (VA) |
| ELVAX 265*** | 75 | 28 (VA) |
| AMPLIFY GR 216**** |  |  |

*Available from The Dow Chemical Company (a chlorinated polyethylene).
**Available from Lanxess (an ethylene vinyl acetate copolymer).
***Available from DuPont (an ethylene vinyl acetate copolymer).
****Available from The Dow Chemical Company (MAH-functionalized ethylene-based polymer).

TABLE 3

Flame Retardants

| Flame Retardant | |
|---|---|
| MAGNIFIN H-5* | $Mg(OH)_2$ |
| MARTINAL OL-104LEO** | $Al(OH)_3$ |
| SAYTEX BT-93W*** | Ethylenebistetrabromophthalimide |
| TMS/TIMONOX RED STAR*** | Antimony Trioxide $Sb_2O_3$ |

*Available from Albemarle Corporation.
**Available from Albemarle Corporation.
***Available from Albemarle Corporation.
****Available from Chemtura.

TABLE 4

Inorganic Filler

| Filler | |
|---|---|
| ZEOLITE 4A* | 1 $Na_2O$:1 $Al_2O_3$:2.0 ± 0.1 $SiO_2$:x $H_2O$ |

*Available from TRICAT; capable of being excited by an alternating electromagnetic field at a frequency greater than, or equal to, 10 MHz.

TABLE 5

Additives

| Additive | Function |
|---|---|
| TiO2* | Color pigment |
| IRGANOX B225** | Antioxidant |
| CHIMASORB 2020*** | UV additive |
| MAGLITE A (RX-13911)**** | Thermal stabilizer |

*Available from DuPont.
**Available from Ciba Specialty Chemicals.
***Available from BASF.
****Available from HallStar company.

Compositions

Compositions were prepared, and are shown in Tables 6-9. The compositions were compounded on a Coperion ZSK-26 60 L/D extruder with a general purpose screw (15 barrels). The extruder was run at a 300 RPM screw speed, with a temperature setting at 150° C. for each barrel. For each formulation, a dry powder mixture of the additives was prepared, and a mixture of the polymer pellets was prepared. The polymer pellet mixture and about 60 wt % of the total dry powder mixture were fed into the feed throat of the extruder. The remaining dry powder mixture was fed into the extruder using a side-arm at barrel #8. The molten polymer composition exited the extruder through a two hole die, to form two strands of extrudate, and the extrudate strands were passed through a 16' long water bath, for water quenching. The strands were then passed through a Berlyn Air Knife to remove excess water. Once the strands were cooled, and dried sufficiently, they were chopped into pellets via a Lab Tech side cutter.

TABLE 6

Comparative Compositions (A-F)

| | A | B | C | D | E | F |
|---|---|---|---|---|---|---|
| INFUSE 9500 (first ethylene-based polymer) | 15.87 wt % | 15.87 wt % | 25.77 wt % | | | |
| INFUSE 9817 (second ethylene-based polymer) | 15.87 wt % | 15.87 wt % | 25.77 wt % | | | |
| Density of First composition (g/cc)* | 0.877 | 0.877 | 0.877 | | | |
| Melt index (I2) of First composition (g/10 min) | 8.2 | 8.2 | 8.2 | | | |
| ENGAGE 8450 (first ethylene-based interpolymer) | | | | 15.87 wt % | 15.87 wt % | 25.77 wt % |
| ENGAGE 8411 (second ethylene-based interpolymer) | | | | 15.87 wt % | 15.87 wt % | 25.77 wt % |
| Density of First composition (g/cc)* | | | | 0.891 | 0.891 | 0.891 |
| Melt index (I2) of First composition (g/10 min) | | | | 6.9 | 6.9 | 6.9 |
| ZEOLITE 4A | 20.31 wt % | 20.31 wt % | | 20.31 wt % | 20.31 wt % | |
| AMPLIFY GR 216 | 9.52 wt % | 9.52 wt % | | 9.52 wt % | 9.52 wt % | |
| ELVAX 265 | 14.60 wt % | 14.60 wt % | | 14.60 wt % | 14.60 wt % | |
| TYRIN 6000 (CPE) | | | 41.23 wt % | | | 41.23 wt % |
| IRGANOX B225 | 0.10 wt % | 0.10 wt % | 0.15 wt % | 0.10 wt % | 0.10 wt % | 0.15 wt % |
| CHIMASORB 2020 | 0.24 wt % | 0.24 wt % | 0.39 wt % | 0.24 wt % | 0.24 wt % | 0.39 wt % |
| MAGLITE A (RX-13911) | | | 2.58 wt % | | | 2.58 wt % |
| TiO2 | 1.27 wt % | 1.27 wt % | 2.06 wt % | 1.27 wt % | 1.27 wt % | 2.06 wt % |
| MDH (MAGNIFIN H-5) | 22.22 wt % | | | 22.22 wt % | | |
| ATH (MARTINAL OL-104LEO) | | 22.22 wt % | | | 22.22 wt % | |
| TMS/TIMONOX RED STAR | | | 2.06 wt % | | | 2.06 wt % |
| Total | 100 wt % | 100 wt % | 100 wt % | 100 wt % | 100 wt % | 100 wt % |

Each wt % based on the total weight of the composition.

*Density of First composition determined from the following equation: $1/p_b = w_1/p_1 + w_2/p_2$, where $p_b$ = the density of the First composition, $w_1$ = weight fraction of the first ethylene-based interpolymer, $p_1$ = density of the first ethylene-based interpolymer, $w_2$ = weight fraction of the second ethylene-based interpolymer, $p_2$ = density of the second ethylene-based interpolymer. For additional ethylene-based interpolymers: $1/p_b = \Sigma\, w_i/p_i$, for i = 1 to n, where n = the total number of ethylene-based interpolymers in the First composition; wi = the weight fraction of the ith ethylene-based interpolymer, $p_i$ = the melt index of the ith ethylene-based interpolymer. First composition contains the first ethylene-based interpolymer and the second ethylene-based interpolymer.

Melt index (I2) of the First composition can also be estimated from the following equation:

$1/I2_b = \Sigma[w_i(1/I2_i)^{1/\alpha}]^\alpha$. $I2_b$ = the melt index (I2) of the First composition, $w_i$ = the weight fraction of the ith ethylene-based interpolymer, $I2_i$ = the melt index of the ith ethylene-based interpolymer, and $\alpha$ = 3.5. For each of Compositions A through C, the calculated melt index (I2) of the first composition is 8.3 g/10 min (measured = 8.2 g/10 min). For each of Compositions D through E, the calculated melt index (I2) is 6.6 g/10 min (measured = 6.9 g/10 min).

TABLE 7

Inventive (1-4) and Comparative (G, H) Compositions

|  | G | 1 | 2 | 3 | H | 4 |
|---|---|---|---|---|---|---|
| INFUSE 9500 (first ethylene-based interpolymer) | 14.08 wt % | 12.05 wt % | 10.00 wt % | 12.05 wt % | 14.08 wt % | 12.05% |
| INFUSE 9817 (second ethylene-based interpolymer) | 14.08 wt % | 12.05 wt % | 10.00 wt % | 12.05 wt % | 14.08 wt % | 12.05% |
| Density of First composition (g/cc)* | 0.877 | 0.877 | 0.877 | 0.877 | 0.877 | 0.877 |
| Melt index (I2) of First composition (g/10 min) | 8.2 | 8.2 | 8.2 | 8.2 | 8.2 | 8.2 |
| ZEOLITE 4A | 19.72 wt % | 19.27 wt % | 19.00 wt % | 19.27 wt % | 19.72 wt % | 19.27 wt % |
| AMPLIFY GR 216 | 8.45 wt % | 7.23 wt % | 6.00 wt % | 7.23 wt % | 8.45 wt % | 7.23 wt % |
| LAVAPREN 500 |  |  |  |  | 14.08 wt % | 12.05 wt % |
| ELVAX 265 | 14.08 wt % | 12.05 wt % | 10.00 wt % | 12.05 wt % |  |  |
| IRGANOX B225 | 0.08 wt % | 0.07 wt % | 0.06 wt % | 0.07 wt % | 0.08 wt % | 0.07 wt % |
| CHIMASORB 2020 | 0.21 wt % | 0.18 wt % | 0.15 wt % | 0.18 wt % | 0.21 wt % | 0.18 wt % |
| TiO2 | 1.13 wt % | 0.96 wt % | 0.80 wt % | 0.96 wt % | 1.13 wt % | 0.96 wt % |
| MDH (MAGNIFIN H-5) | 28.17 wt % | 36.14 wt % | 44.00 wt % |  | 28.17 wt % | 36.14 wt % |
| ATH (MARTINAL OL-104LEO) |  |  |  | 36.14 wt % |  |  |
| Total | 100 wt % | 100 wt % | 100 wt % | 100 wt % | 100 wt % | 100 wt % |

Each wt % based on the total weight of the composition.

*Density of First composition determined from the following equation: $1/p_b = w_1/p_1 + w_2/p_2$, where $p_b$ = the density of the First composition, $w_1$ = weight fraction of the first ethylene-based interpolymer, $p_1$ = density of the first ethylene-based interpolymer, $w_2$ = weight fraction of the second ethylene-based interpolymer, $p_2$ = density of the second ethylene-based interpolymer. For additional ethylene-based interpolymers: $1/p_b = \Sigma w_i/p_i$, for $i = 1$ to $n$, where $n$ = the total number of ethylene-based interpolymers in the First composition; $w_i$ = the weight fraction of the ith ethylene-based interpolymer, $p_i$ = the melt index of the ith ethylene-based interpolymer. First composition contains the first ethylene-based interpolymer and the second ethylene-based interpolymer.

TABLE 8

Inventive (5-9)

|  | 5 | 6 | 7 | 8 | 9 |
|---|---|---|---|---|---|
| INFUSE 9500 (first ethylene-based interpolymer) | 10.00 wt % | 11.41 wt % | 22.93 wt % | 20.49 wt % | 18.24 wt % |
| INFUSE 9817 (second ethylene-based interpolymer) | 10.00 wt % | 11.41 wt % | 22.93 wt % | 20.49 wt % | 18.24 wt % |
| Density of First composition (g/cc)* | 0.877 | 0.877 | 0.877 | 0.877 | 0.877 |
| Melt index (I2) of First composition (g/10 min) | 8.2 | 8.2 | 8.2 | 8.2 | 8.2 |
| ZEOLITE 4A | 19.00 wt % | 19.40 wt % |  |  |  |
| AMPLIFY GR 216 | 6.00 wt % | 6.85 wt % |  |  |  |
| LAVAPREN 500 | 10.00 wt % |  |  |  |  |
| ELVAX 265 |  | 11.41 wt % |  |  |  |
| TYRIN 6000 |  |  | 36.69 wt % | 34.83 wt % | 34.30 wt % |
| IRGANOX B225 | 0.06 wt % | 0.07 wt % | 0.14 wt % | 0.12 wt % | 0.11 wt % |
| CHIMASORB 2020 | 0.15 wt % | 0.17 wt % | 0.34 wt % | 0.31 wt % | 0.27 wt % |
| MAGLITE A (RX-13911) |  |  | 2.29 wt % | 2.05 wt % | 1.82 wt % |
| TiO2 | 0.80 wt % | 0.91 wt % | 1.83 wt % | 1.64 wt % | 1.46 wt % |
| MDH (MAGNIFIN H-5) | 44.00 wt % | 27.39 wt % |  |  |  |
| SAYTEX BT-93W |  | 8.22 wt % | 9.17 wt % | 14.34 wt % | 18.24 wt % |
| TMS/TIMONOX RED STAR |  | 2.74 wt % | 3.67 wt % | 5.74 wt % | 7.30 wt % |
| Total | 100 wt % | 100 wt % | 100 wt % | 100 wt % | 100 wt % |

Each wt % based on the total weight of the composition.

*Density of First composition determined from the following equation: $1/p_b = w_1 p_1 + w_2/p_2$, where $p_b$ = the density of the First composition, $w_1$ = weight fraction of the first ethylene-based interpolymer, $p_1$ = density of the first ethylene-based interpolymer, $w_2$ = weight fraction of the second ethylene-based interpolymer, $p_2$ = density of the second ethylene-based interpolymer. For additional ethylene-based interpolymers: $1/p_b = \Sigma w_i/p_i$, for $i = 1$ to $n$, where $n$ = the total number of ethylene-based interpolymers in the First composition; $w_i$ = the weight fraction of the ith ethylene-based interpolymer, $p_i$ = the melt index of the ith ethylene-based interpolymer. First composition contains the first ethylene-based interpolymer and the second ethylene-based interpolymer.

TABLE 9

Inventive Compositions (9-13)

| | 10 | 11 | 12 | 13 | 14 |
|---|---|---|---|---|---|
| IN FUSE 9500 (first ethylene-based interpolymer) | 11.23 wt % | 11.23 wt % | 11.23 wt % | 11.23 wt % | 19.92 wt % |
| INFUSE 9817 (second ethylene-based interpolymer) | 11.23 wt % | 11.23 wt % | 11.23 wt % | 11.23 wt % | 19.92 wt % |
| Density of First composition (g/cc)* | 0.877 | 0.877 | 0.877 | 0.877 | 0.877 |
| Melt index (I2) of First Composition (g/10 min) | 8.2 | 8.2 | 8.2 | 8.2 | 8.2 |
| ZEOLITE 4A | 17.98 wt % | 17.98 wt % | 17.98 wt % | 17.98 wt % | |
| AMPLIFY GR 216 | 6.74 wt % | 6.74 wt % | 6.74 wt % | 6.74 wt % | |
| LAVAPREN 500 | | | 11.23 wt % | 11.23 wt % | |
| ELVAX 265 | 11.23 wt % | 11.23 wt % | | | |
| TYRIN 6000 (CPE) | | | | | 33.86 wt % |
| IRGANOX B225 | 0.07 wt % | 0.07 wt % | 0.07 wt % | 0.07 wt % | 0.12 wt % |
| CHIMASORB 2020 | 0.17 wt % | 0.17 wt % | 0.17 wt % | 0.17 wt % | 0.30 wt % |
| MAGLITE A (RX-13911) | | | | | 1.99 wt % |
| TiO2 | 0.90 wt % | 0.90 wt % | 0.90 wt % | 0.90 wt % | 1.59 wt % |
| MDH (MAGNIFIN H-5) | 40.44 wt % | | 40.44 wt % | | |
| ATH (MARTINAL OL-104LEO) | | 40.44 wt % | | 40.44 wt % | |
| SAYTEX BT-93W | | | | | 15.93 wt % |
| TMS/TIMONOX RED STAR | | | | | 6.37 wt % |
| Total | 100 wt % | 100 wt % | 100 wt % | 100 wt % | 100 wt % |

Each wt % based on the total weight of the composition.

*Density of First composition determined from the following equation: $1/p_b = w_1/p_1 + w_2/p_2$, where $p_b$ = the density of the First composition, $w_1$ = weight fraction of the first ethylene-based interpolymer, $p_1$ = density of the first ethylene-based interpolymer, $w_2$ = weight fraction of the second ethylene-based interpolymer, $p_2$ = density of the second ethylene-based interpolymer. For additional ethylene-based interpolymers: $1/p_b = \Sigma w_i/p_i$, for i = 1 to n, where n = the total number of ethylene-based interpolymers in the First composition; $w_i$ = the weight fraction of the ith ethylene-based interpolymer, $p_i$ = the melt index of the ith ethylene-based interpolymer. First composition contains the first ethylene-based interpolymer and the second ethylene-based interpolymer.

Injection Molding

All of the sample plaques for properties (density, VICAT, Shore A Hardness, Tensile properties—see "Test Methods" section) measurement were obtained by molding each composition using a KRAUSS MAFFEI KM 110-390/390 CL Injection Molding Machine, equipped with a single shot mold base. The injection molding process conditions are listed below in Table 10. Composition properties are shown in Tables 11 and 12 below.

TABLE 10

| Injection Molding Conditions | |
|---|---|
| Barrel and Mold Temperatures | |
| Hopper zone (° C.) | 30 |
| Zone 1 Temperature (° C.) | 110 |
| Zone 2 Temperature (° C.) | 150 |

TABLE 10-continued

| Injection Molding Conditions | |
|---|---|
| Zone 3 Temperature (° C.) | 165 |
| Zone 4 Temperature (° C.) | 165 |
| Zone 5 Temperature (° C.) | 165 |
| Nozzle Temperature (° C.) | 165 |
| Mold Temperature (° F.) | 80 |
| Extruder | |
| RPM (1/min) | 100 |
| Backpressure (Bar) | 30 |
| Optimal Injection | |
| Injection Speed (ccm/s) | 20 |
| Injection pressure (Bar) | 2000 |
| Hold | |
| Hold Pressure (Bar) | 500 |

TABLE 11

Comparative Composition Properties (A-F)

| | A | B | C | D | E | F |
|---|---|---|---|---|---|---|
| Density (g/cc) | 1.16 | 1.08 | 1.02 | 1.1 | 1.19 | 1.04 |
| I2@ 190 C. (g/10 min) | 1.2 | 1.2 | 1.8 | 0.9 | 1 | 0.9 |
| I10@ 190 C. (g/10 min) | 13.1 | 13.6 | 19.3 | 11 | 11.6 | 17.8 |
| I10/I2 | 11 | 11 | 11 | 12 | 12 | 20 |
| Avg VICAT (C.) | 43.5 | 44.1 | 39 | 59.3 | 57.6 | 47.9 |
| Shore A Hardness | 81.6 | 81.2 | 65.4 | 88.5 | 87.9 | 79.4 |
| DSC Delta H melt (J/g) | 25.5 | 31.8 | 40.9 | 37.7 | 38.1 | 45.5 |
| DSC $T_{m1}$ (C.) | 122.3 | 122.2 | 123 | 97.3 | 97 | 98.7 |
| Avg-20% Mod (psi) | 380.4 | 375.5 | 213.1 | 671.2 | 625.2 | 291.2 |
| Avg-Strain @ Break (%) | 182.9 | 279.1 | 854.3 | 285.4 | 238.3 | 724.1 |
| Avg-Stress @ Break (psi) | 611.6 | 661.5 | 842.5 | 1298.2 | 1098.2 | 1749.9 |

TABLE 12

Inventive Composition Properties (10-14)

|  | 10 | 11 | 12 | 13 | 14 |
|---|---|---|---|---|---|
| Density (g/cc) | 1.4 | 1.4 | 1.4 | 1.4 | 1.2 |
| I2 @ 190 C. (g/10 min) | 0.1 | 0.4 | 0.1 | 0.4 | 1.0 |
| I10@ 190 C. (g/10 min) | 3.9 | 5.8 | 3.4 | 4.3 | 14.7 |
| I10/I2 | 39 | 14 | 34 | 11 | 15 |
| Avg VICAT (° C.) | 55.8 | 56.1 | 47.2 | 45.8 | 42.2 |
| Shore A Hardness | 89.9 | 90.2 | 86.1 | 85.7 | 71.4 |
| DSC Delta H melt (J/g) | 23.39 | 20.86 | 17.07 | 16.18 | 30.66 |
| DSC $T_{m1}$ (° C.) | 122.61 | 122.63 | 122.51 | 122.78 | 123.88 |
| Avg-10% Mod (psi) | 588.8 | 578.2 | 433.5 | 404.4 | 186.8 |
| Avg-20% Mod (psi) | 744.7 | 726.1 | 565.8 | 530.9 | 267.9 |
| Avg-30% Mod (psi) | 834.6 | 805.9 | 643.9 | 603.8 | 308.9 |
| Avg-Strain @ Break (%) | 286.4 | 348.9 | 329.0 | 354.2 | 966.6 |
| Avg-Stress @ Break (psi) | 1365.2 | 1245.0 | 989.1 | 878.4 | 868.5 |
| Avg-Flex Modulus (ksi) | 17.7 | 19.7 | 11.8 | 13.9 | 4.2 |

Flammability

The flammability of each composition was tested according the standard NFPA 701 test method 1 (see NFPA 701-2010 for test set-up). Three test specimens were examined for each composition, and the average values reported.

Each composition (60 grams) in pellet form was compression molded into a chase of dimensions: 150 mm (±5 mm)×400 mm (±5 mm)×0.38 mm [or 5.9 in (±0.2 in)×15.8 in (±0.2 in)×0.015 in] using a hydraulic PHI rubber press, set at 150° C. and 40,000 psi. This sample chase was placed into heated platens, and pressured to 40,000 psi for 5½ minutes. Next, the sample in the chase was removed from the press, and allowed to cool on a lab bench. Samples were removed from the chase, and the sample flash was trimmed off using lab scissors.

Each test specimen (of above chase dimensions) was exposed to an igniting flame for 45 seconds. After 45 seconds of burning, the flame was removed. The "after flame time" of the specimen (burning time of the specimen after the flame was removed), and the burning time of material that fell to the bottom of the text chamber, were each measured and recorded.

To pass the above test method 1, the following criteria must be met: (1) the average weight loss due to the burn damage must be 40 percent or less (based on the initial weight of the test specimen), and (2) fragments of residues of specimens that fall to the bottom of the test chamber must not continue to burn for more than two seconds. As seen in Tables 13 and 14, the comparative compositions failed this test method, and the inventive compositions passed this test method.

TABLE 13

Flammability Properties

| Ex. | Mass Loss greater than 40 wt % for all comparatives | <2 second burn time of fallen material, after flame removed (fallen material burns for more than 2 seconds for all comparatives) |
|---|---|---|
| A | fail | fail |
| B | fail | fail |
| C | fail | fail |
| D | fail | fail |
| E | fail | fail |
| F | fail | fail |

TABLE 14

Flammability Properties

| Ex. | % Mass Loss = (Wt before burn – Wt after burn)/Wt before burn | Burn time of fallen material (sec) after flame removed |
|---|---|---|
| G | 29.4 ± 50.3 | 157 (fail) |
| 1 | 1.5 ± 1.3 | 0 |
| 2 | 1.4 ± 2.3 | 0 |
| 3 | 0.4 ± 0.1 | 0 |
| H | 27.8 ± 47.3 | 250 (fail) |
| 4 | 0.4 ± 0.2 | 0 |
| 5 | 0.2 ± 0.0 | 0 |
| 6 | 0.1 ± 0.1 | 0 |
| 7 | 0.2 ± 0.3 | 0 |
| 8 | 0.6 ± 0.7 | 0 |
| 9 | 0.2 ± 0.1 | 0 |
| 14 | 1.9 | 0 |

Tape Extrusion

Each composition, in pellet form, was extruded with a HAAKE single extruder (¾" diameter and 25 L/D; with three heating zones in the barrel), and equipped with a tape/slot die. The following extrusion conditions were applied: approximately 50 RPM screw speed, and a temperature profile from 140° C. (heating zone 1), 160° C. (heating zone 2), 190° C. (heating zone 3), and 190° C. (die). The extrudate (tape (film form)) was extruded onto a chill roll system with a three roll configuration. The temperature of each chill roll was controlled at about 15° C. The finished tapes were collected on a wind-up system, and the dimension of each tape was from 3.5 to 4 inches wide, and from 10 to 15 mils thick.

Dielectric Properties and RF Welding

The extrudated tapes (10-15 mils thick) were Radio-Frequency welded with a CALLANAN RF Welder. The power output of the CALLANAN RF Welder was 2 KW, and the operation/generator frequency was 27.12 MHz. For each composition, "10 inch lengths" of tape were cut to provide a "3.5-4 inch×10 inch×10-15 mils" tape section. Two tape sections were placed, one on top of the other, to form a "3.5-4 inch×10 inch×20-30 mils" tape test sample. A seal bar/die of dimensions "½ inch×8 inch" was positioned in the mid-line region of the test sample, with the length of the bar parallel to the length of the test sample, to form a RF weld of dimensions: ½ inch×8 inch, along the length of the test sample, with a one inch unwelded region at each end of the test sample. The films were sealed in the machine direction.

During the RF welding process, the films to be welded were placed between the seal bar and a bottom metal plate. The seal bar was brought down to the bottom metal plate via a pneumatic cylinder, at 30 psi pressure, and the films were pressed between the bar and the plate when the radio frequency (alternating electromagnetic field) was applied. The power level setting could be adjusted from 0% to 100%. The typical setting was 80%-90% in this study. The typical weld time was from 2 to 4 seconds. In order to tune the RF welder, the Clayton setting was adjusted to optimize the resonant frequency of the work piece. The maximum power could be coupled, out of the generator, when the resonant frequency of the work piece was nearly resonant at the output frequency of generator (27.12 MHz). In this study, the Clayton setting was set from 20 to 22. Results are shown in Tables 15 and 16. After each test sample was welded, the sample was allowed to cool to room temperature overnight at ambient temperature and atmosphere. The test sample was then hand pulled, to determine if the two tape sections could be separated without breaking the weld (or without a "break at seal" failure). If such separation occurred, the test sample was not RF weldable. If no such separation occurred, the test was RF weldable.

TABLE 15

Comparative Compositions - RF Weld Results

| Example | RF welding test Weld time (s) @ 90% power | RF welding test |
|---|---|---|
| A | 6 | RF weldable |
| B | 4 | RF weldable |
| C | 3 | RF weldable |
| D | 3 | RF weldable |
| E | 3 | RF weldable |
| F | 3 | RF weldable |

TABLE 16

Inventive Compositions - RF Weld Results

| | RF welding test Weld time (s) @ 90% power | RF welding test |
|---|---|---|
| 10 | 4 | RF weldable |
| 11 | 4 | RF weldable |
| 12 | 4 | RF weldable |
| 13 | 4 | RF weldable |
| 14 | 4 | RF weldable |

The alternating electric field causes the dipole in materials to oscillate. Polar molecules in an electric field tend to orient in the field direction, so that the positive (or negative) end of the dipole aligns to the negative (or positive) charges in the electric field, respectively. Since the dipole polarization is not instantaneous at the high frequencies used in RF welding, as the dipoles try to align with the rapidly alternating electric field, orientation becomes out-of-phase. The imperfect alignment causes internal molecular friction, and results in the generation of heat. These inventive compositions exhibited very good RF weldability, as shown above.

The invention claimed is:

1. A composition comprising at least the following components:
  A) a first composition comprising a first ethylene/α-olefin block copolymer consisting of ethylene and $C_4$-$C_8$ α-olefin comonomer; and where the first composition has a density from 0.87 g/cc to 0.90 g/cc, and a melt index (I2) from 6.0 to 20.0 g/10 min;
  B) at least one filler that is capable of being excited by an alternating electromagnetic field at a frequency greater than, or equal to 10 MHz;
  C) at least one flame retardant selected from the group consisting of
    i) from 30.0 to 50.0 wt % of one or more non-halogen, inorganic flame retardant compounds, based on the weight of the composition; and
    ii) from 8.0 to 30.0 wt % of one or more halogen-containing flame retardant compounds, based on the weight of the composition; and
  D) at least one polar polymer.

2. The composition of claim 1, wherein the polar polymer is selected from the group consisting of an ethylene vinyl acetate (EVA), a chlorinated ethylene-based polymer copolymer; a maleic anhydride functionalize olefin-based polymer; an ethylene-acrylic acid copolymer; an ethylene-acrylate copolymer; and a combination thereof.

3. The composition of claim 1, wherein the first composition further comprises a second ethylene/α-olefin block copolymer consisting of ethylene and $C_4$-$C_8$ α-olefin comonomer, wherein the second ethylene/α-olefin block copolymer is different than the first ethylene/α-olefin block copolymer.

4. The composition of claim 3, wherein the weight ratio of the first ethylene/α-olefin block copolymer to the second ethylene/α-olefin block copolymer is from 0.8 to 1.2.

5. The composition of claim 4, wherein the density ratio of the first ethylene/α-olefin block copolymer to the second ethylene/α-olefin block copolymer is from 0.8 to 1.2.

6. The composition of claim 3, wherein the I2 ratio of the first ethylene/α-olefin block copolymer to the second ethylene/α-olefin block copolymer is from 0.10 to 0.60.

7. The composition of claim 1, wherein the composition has a density from 1.2 to 1.4 g/cc.

8. The composition of claim 1, wherein the composition has an I2 from 0.1 to 2.0 g/10 min.

9. The composition of claim 1, wherein the composition has an I10 from 2.0 to 20.

10. The composition of claim 1, wherein the composition has a ratio I10/I2 from 10 to 50.

11. The composition of claim 1, wherein the composition has a % mass loss (NFPA 701 test method) less than, or equal to 5 wt %.

12. An article comprising at least one component formed from the composition of claim 1.

13. The composition of claim 1 comprising from 10 wt % to 30 wt % filler comprising a zeolite.

14. The composition of claim 1, wherein the polar polymer is comprises a chlorinated ethylene-based polymer copolymer.

15. The composition of claim 1, wherein the flame retardant is the non-halogen, inorganic flame retardant compound; and
  the weight ratio of the first composition to the flame retardant is from 0.35 to 0.75.

16. The composition of claim 1, wherein the flame retardant is the halogen-containing flame retardant compound; and
  the weight ratio of the first composition to the flame retardant is from 1.90 to 5.50.

17. The composition of claim 1, wherein the composition has
  a Shore A Hardness from 70 to 92; and
  a melting point from 115° C. to 135° C.

18. The composition of claim 3 comprising
  A) the first composition comprising
    i) from 5 wt % to 25 wt % of the first ethylene/α-olefin block copolymer, based on the total weight of the composition;
    ii) from 5 wt % to 25 wt % of the second ethylene/α-olefin block copolymer;
  B) from 10 wt % to 30 wt % filler comprising a zeolite;
  C) from 30.0 to 50.0 wt % of the non-halogen, inorganic flame retardant compound, wherein the weight ratio of the first composition to non-halogen, inorganic flame retardant compound is from 0.35 to 0.75;
  D) from 15 wt % to 40 wt % of the polar polymer;
  wherein the composition passes the standard NFPA 701 test method 1, and the composition has
    i) a Shore A Hardness from 70 to 92;
    ii) a melting point from 115° C. to 135° C.

19. An article comprising
  a first film and a second film, the first film and the second film each comprising the composition of claim 18;

a radio frequency (RF) weld that seals the first film to the second film; and the RF weld does not separate when the first film and the second film are hand-pulled apart.

\* \* \* \* \*